United States Patent
Hadzicki et al.

(10) Patent No.: US 8,256,784 B2
(45) Date of Patent: *Sep. 4, 2012

(54) TRICYCLE WITH FRONT AND REAR STEERING

(76) Inventors: Tyler Hadzicki, Poway, CA (US); Joseph Hadzicki, Poway, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/229,644

(22) Filed: Sep. 9, 2011

(65) Prior Publication Data

US 2012/0001400 A1    Jan. 5, 2012

Related U.S. Application Data

(63) Continuation of application No. 12/784,742, filed on May 21, 2010, now Pat. No. 8,016,311.

(51) Int. Cl.
*B62M 1/14* (2006.01)
(52) U.S. Cl. ........................ 280/244; 280/263
(58) Field of Classification Search .................. 280/240, 280/233, 234, 282, 269, 267, 266, 281, 263
See application file for complete search history.

(56) References Cited

U.S. PATENT DOCUMENTS

| | | | | |
|---|---|---|---|---|
| 3,485,507 A * | 12/1969 | Christof | ......................... | 280/202 |
| 4,198,072 A * | 4/1980 | Hopkins | ......................... | 280/267 |
| 4,279,429 A * | 7/1981 | Hopkins et al. | ................. | 280/267 |
| 4,659,098 A * | 4/1987 | Jacobson | .................... | 280/288.1 |
| 5,568,935 A * | 10/1996 | Mason | ......................... | 280/282 |
| 5,620,196 A * | 4/1997 | Belik | ......................... | 280/281.1 |
| 6,062,581 A * | 5/2000 | Stites | ......................... | 280/263 |
| 6,572,130 B2 * | 6/2003 | Greene et al. | ................ | 280/266 |
| 6,585,278 B1 * | 7/2003 | Cerqua et al. | ................ | 280/287 |
| 6,742,797 B2 * | 6/2004 | Lopez | ......................... | 280/287 |
| 6,953,203 B2 * | 10/2005 | Wilcox et al. | ................ | 280/282 |
| 7,044,491 B2 * | 5/2006 | Kettler et al. | ................ | 280/282 |
| 7,416,203 B2 * | 8/2008 | Tollhurst | ..................... | 280/259 |
| 7,748,728 B2 * | 7/2010 | Dixon | ......................... | 280/202 |
| 2004/0026891 A1 * | 2/2004 | Berkelmans | .................. | 280/282 |
| 2010/0237582 A1 * | 9/2010 | Belenkov et al. | ............ | 280/220 |

* cited by examiner

*Primary Examiner* — Tashiana Adams
(74) *Attorney, Agent, or Firm* — Mintz Levin Cohn Ferris Glovsky and Popeo, P.C.

(57) ABSTRACT

A vehicle with front and rear steering is disclosed. The vehicle can be a cycle. The cycle includes a front wheel steered by a front hand-steering mechanism, and two back wheels steered by a back hand-steering mechanism. The back wheels are dual inclined casters with full rotational movement. A drive train forward of the front wheel drives the front wheel, while a rider is inclined in a seat in a recumbent orientation. The front and rear steering provides unlimited maneuverability and turning capabilities.

20 Claims, 12 Drawing Sheets

TRICYCLE WITH FRONT AND REAR STEERING

CROSS REFERENCE TO RELATED APPLICATIONS

This application is a continuation and claims the benefit of priority under 35 U.S.C. §120 of U.S. patent application Ser. No. 12/784,742, filed May 21, 2010, entitled "TRICYCLE WITH FRONT AND REAR STEERING", which the disclosure of which is incorporated herein by reference.

BACKGROUND

The present disclosure relates to a pedal-powered vehicle, and more particularly to a cycle having three or more wheels and including front and rear steering.

Consumers are always looking for new and exciting vehicles to ride. Some vehicles are cycles, such as bicycles and tricycles, that operate and are driven by human power. While modern cycles incorporate technological improvements such as lighter and stronger materials, and better performing components, the basic utility and operation of cycles has not changed. Almost all cycles are directed by steering the front tire or tires. Further, cycles typically are driven in a very linear fashion, where quick turns, spinouts or zig-zag motions are impossible.

SUMMARY

This document describes a cycle with front and rear steering, as well as a front wheel drive train, for enhanced maneuverability, speed and utility. In preferred exemplary implementations, the cycle is a recumbent tricycle with a single front wheel and two rear caster wheels. The front wheel is connected to a handlebar steering mechanism, and one rear caster wheel is coupled with a handle steering mechanism In accordance with one aspect, a cycle is disclosed. The cycle includes a main frame. The cycle further includes a front wheel assembly connected with a front portion of the main frame. The front wheel assembly includes a front wheel and a drive train, the drive train being positioned forward of the front wheel by a forward tube and one or more chain stays connected with a wheel support that holds the front wheel. The drive train further includes a pedal-driven crankset for driving the front wheel. The front wheel assembly further includes a front hand-steering mechanism connected with the wheel support and forward tube to steer the front wheel assembly and front wheel relative to the main frame.

The cycle further includes a seat coupled on a back portion of the main frame, and a rear wheel assembly connected with the back portion of the main frame. The rear wheel assembly includes a cross bar mounted laterally to the main frame and extending out opposite sides aft of the seat. The rear wheel assembly further includes a pair of rear swivel caster wheels, where each swivel caster wheel is connected to an opposite distal end of the cross bar at an incline. The rear wheel assembly further includes a rear hand-steering mechanism connected with at least one of the rear swivel caster wheels.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

This document describes a vehicle, such as a recumbent tricycle. The recumbent tricycle includes a main frame, having a front portion and a rear portion and a rear crossbar. The vehicle includes a front wheel assembly and a plurality of rear wheel assemblies. The rear wheel assemblies may be pivotably attached to opposing end portions of the crossbar and include wheels that are configured for independent rotation within the assemblies. The front wheel assembly may be pivotably associated with the front portion of the main frame and may include a front wheel and a drive train portion wherein the drive train portion drives the rotation of the front wheel.

Figure 1A:
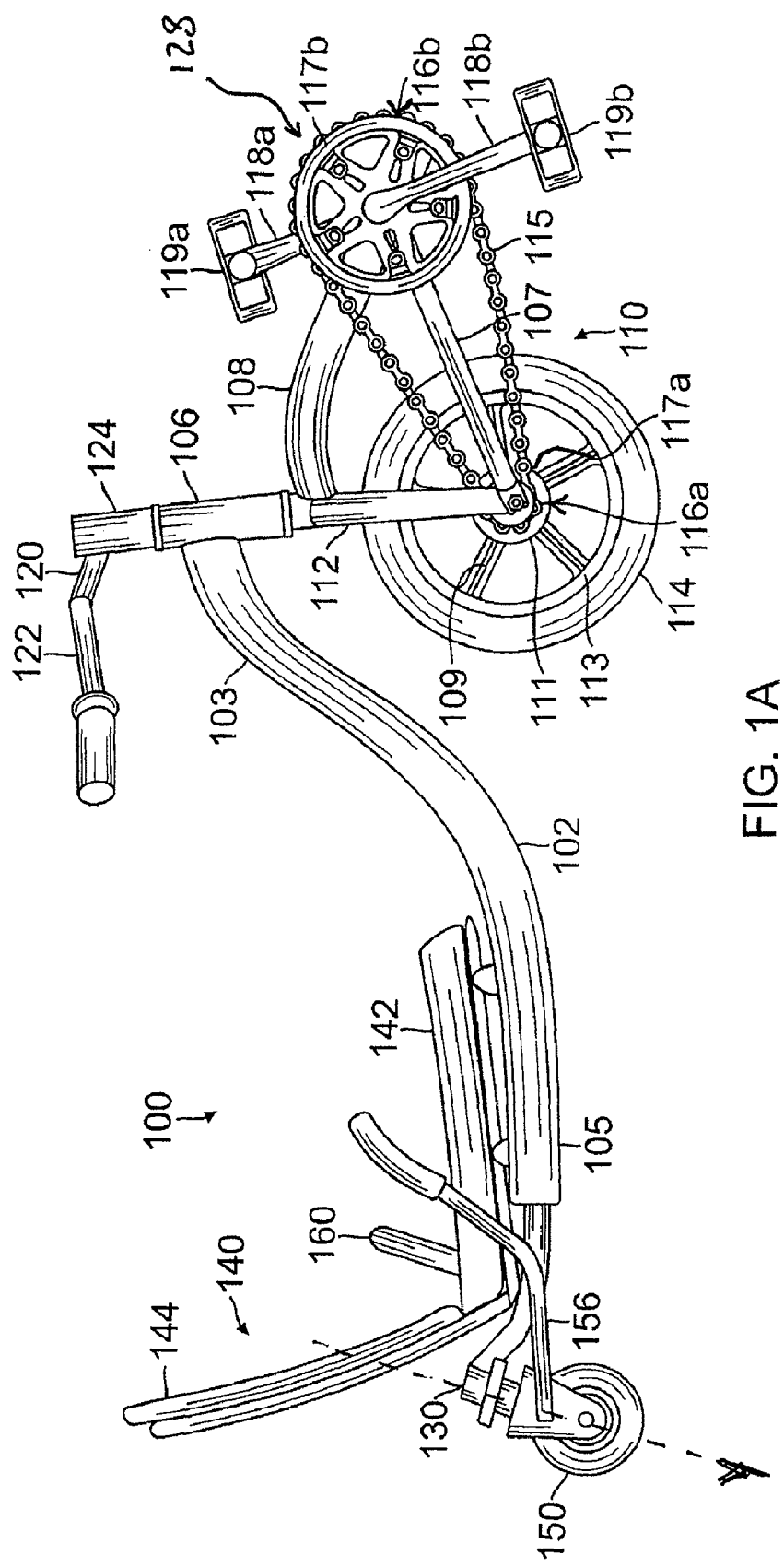
FIG. 1A is a side view illustration of a cycle.

FIG. 1A shows a cycle 100. The cycle 100 includes a main frame 102. The main frame includes a front portion 103 and a rear portion 105. The main frame 102 can be formed of a single member or of multiple members. The main frame 102 may be a solid bar or a tube. The main frame 102 can be made of any rigid and lightweight material such as metal, steel, titanium, aluminum, carbon fiber, thermoplastic, magnesium, bamboo, wood or the like, or combinations thereof. Additionally, the main frame 102 can be of any suitable elongated shape, such as a circular or square, rectangular, trapezoidal, circular, oval shaped, or the like.

The main frame 102 can be formed of a single member that is straight, curved, or both. Alternatively, the main frame 102 can be formed of multiple straight or curved bars or tubes that may be connected together so as to form front and rear portions 103 and 105. In some implementations, the main frame 102 is an elongated bar that is formed to include a straight portion that is low to the ground, such as toward the rear portion 105, and a curved portion that curves upwards toward the front portion 103 to terminate and connect with a head tube 106.

The front wheel assembly 110 includes a wheel support 112, a front wheel 114, and a drive train 116. The front wheel 114 may have any suitable diameter and may include a pneumatic tire or a tubeless tire that is supported by a rim 113 and spokes 109. For instance, the front wheel 114 may have a diameter that is about 24 inches or less, and in certain instances, may be about 14 inches or less, such as about 12 or 10 inches or less. The size of the tire needs to be sufficiently small so as to not extend out sideways too far when steered right or left. The rim 113 can be formed of steel, aluminum, titanium, nylon, carbon fiber, or other rigid and lightweight material. The spokes can include three or more solid, thick spoke members, or may include a larger number of thin wire spokes.

The head tube 106 interacts with a front wheel assembly 110. The head tube 106 may include a headset (not shown), i.e. bearings and/or other hardware, for interfacing with both or one of the wheel support 112 and/or a front steering mechanism 120 that directs the positioning of the wheel support 112 and thereby directs and controls a direction of travel of the cycle 100. Accordingly, the head tube 106 may include an opening that is configured for receiving a top portion of the wheel support 112, which is fitted through the orifice, such that at least part of the wheel support 112 is able to pivot within the head tube 106.

In some implementations, the front steering mechanism 120 includes handlebars 122. The handlebars 122 may include a handlebar stem 124 that connects through the head tube 106 to the wheel support 112. The handlebars 122 can be of any suitable configuration and may include a pair of oppositely extending handgrips. The wheel support 112 may have any configuration so long as it is able to moveably associate with the main frame 102 and hold the front wheel 114 in a manner sufficient to allow the front wheel 114 to rotate. For instance, the wheel support 112 may be a fork with parallel fork blades joined by a crown near the head tube and that end in dropouts, into which an axle of a hub 111 of the front wheel 114 is secured.

The drive train 116 of the front wheel assembly 110 functions to drive the rotation of the front wheel 114, and includes a front wheel portion 116a and a crank portion 116b that is forward of the wheel support 112 and front wheel 114. The drive train 116 includes gears, in which the front wheel portion 116a includes a wheel sprocket 117a that interacts with the hub 111 of the front wheel 114 so as to allow rotation of the front wheel 114. The crank portion 116b includes a crankset 128 and a crank sprocket 117b that is larger than the wheel sprocket 117a and connected to the wheel sprocket 117a via chain 115 or other linking and power relation mechanism.

The crankset 128 is positioned forward of the head tube 106 and front wheel 114 by a forward tube 108 that is coupled to, and extends forward from, the wheel support 112. Alternatively, the forward tube 108 can be coupled to and extending from the steering mechanism 120. Accordingly, the crankset 128 pivots along with the direction of steerage of the front wheel 114, and can be controlled or moved by a rider's legs and feet to contribute to steering the front wheel 114. The crankset 128 can also be supported by one or more chain stays 107 that extend forward from the wheel support 112. As an example, the chain stays 107 can be connected at one end to the dropouts of the forks, and at the other end to a bottom bracket shell (not shown) that houses a crank shaft. Other crankset supports can be used for supporting the crankset in the manner described above. For example, an additional stabilizer may be included. In some instances, one or more flexible stabilizers may extend from the main frame 102 or handle bars to a forward end of the crankshaft support so as to further stabilize the drive train 116.

As discussed, the crankset 128 includes the crank sprocket 117b, a pair (i.e. left and right) of cranks 118a and 118b that are connected through the bottom bracket shell, and left and right pedals 119a and 119b that are rotatably coupled to the ends of the cranks 118a and 118b. The crank shell further includes bearings and other hardware that allows the two cranks to both interconnect and to rotate in concert. The pedals 119a and 119b are operated by a rider to turn cranks 118a and 118b, similar to a conventional recumbent bicycle, such that the cranks 118a and 118b cooperate to turn crank sprocket 116b and translate power via chain 115 to the wheel sprocket 117a.

In some implementations, the wheel and crank sprockets 117a and 117b may include two or more sprockets. The drive train may further include a derailleurs that includes a front and/or a rear derailleur that function to move the chain from one sprocket to another. In this manner, the cycle 100 may include gearing so as to increase or decrease the power necessary to drive the cycle. Accordingly, a gear selector may also be included such that a rider can selectively change between the sprockets and thereby change the gear driving the cycle. The gear selector may be positioned on the main frame 102 or the front steering mechanism 120. The gear selector may be operatively connected to the derailleurs by any mechanism, for instance as by a wire, such that as the selector is moved the derailleur moves, thus directing the positioning of the chain relative to the sprockets and changing the gearing of the vehicle. A breaking mechanism for breaking the front wheel may also be included, for example, on the main frame 102, the front steering mechanism 120, or at another location on the cycle 100. The hub may be internally geared for up to 7 speeds, and may include a coaster brake.

The cycle 100 further includes a seat 140 that allows the rider to be in a recumbent position for powering and steering the front wheel 114, while also having access to one or another of at least two rear wheel assemblies 150. The seat 140 may include a bottom support 142 configured for receiving and supporting the weight of a rider. The seat 140 may additionally include a back support 144 configured to provide support to a back of the rider.

In some implementations, the seat 140 and/or back support 144 includes a deformable frame thereby allowing the seat or a portion thereof to be deformed according to the needs of the rider, such as allowing a greater range of motion of a rider's arm for operating a rear wheel assembly 150. For instance, as can also be seen with particularity in FIG. 1B, the back support 144 of the seat 140 may include one or more adjustable supports 146a and 146b, which supports give structure to the back support portion 144 and are capable of being manipulated in accordance with a riders needs. The adjustable supports 146a and 146b may be made of any type of material, such as a net weave. Articulating seat members 148a and 148b may also be included, and capable of being manipulated by a rider so as to shape the configuration of the back support 144. In some implementations, the bottom support and back supports, 142 and 144, respectively, are separate members that are configured for moving in relationship to one another. For instance, the main frame 102 may additionally include a track and locking mechanism that allows the bottom member 142 to move laterally along the main frame 102 and be locked in place.

Figure 1B:
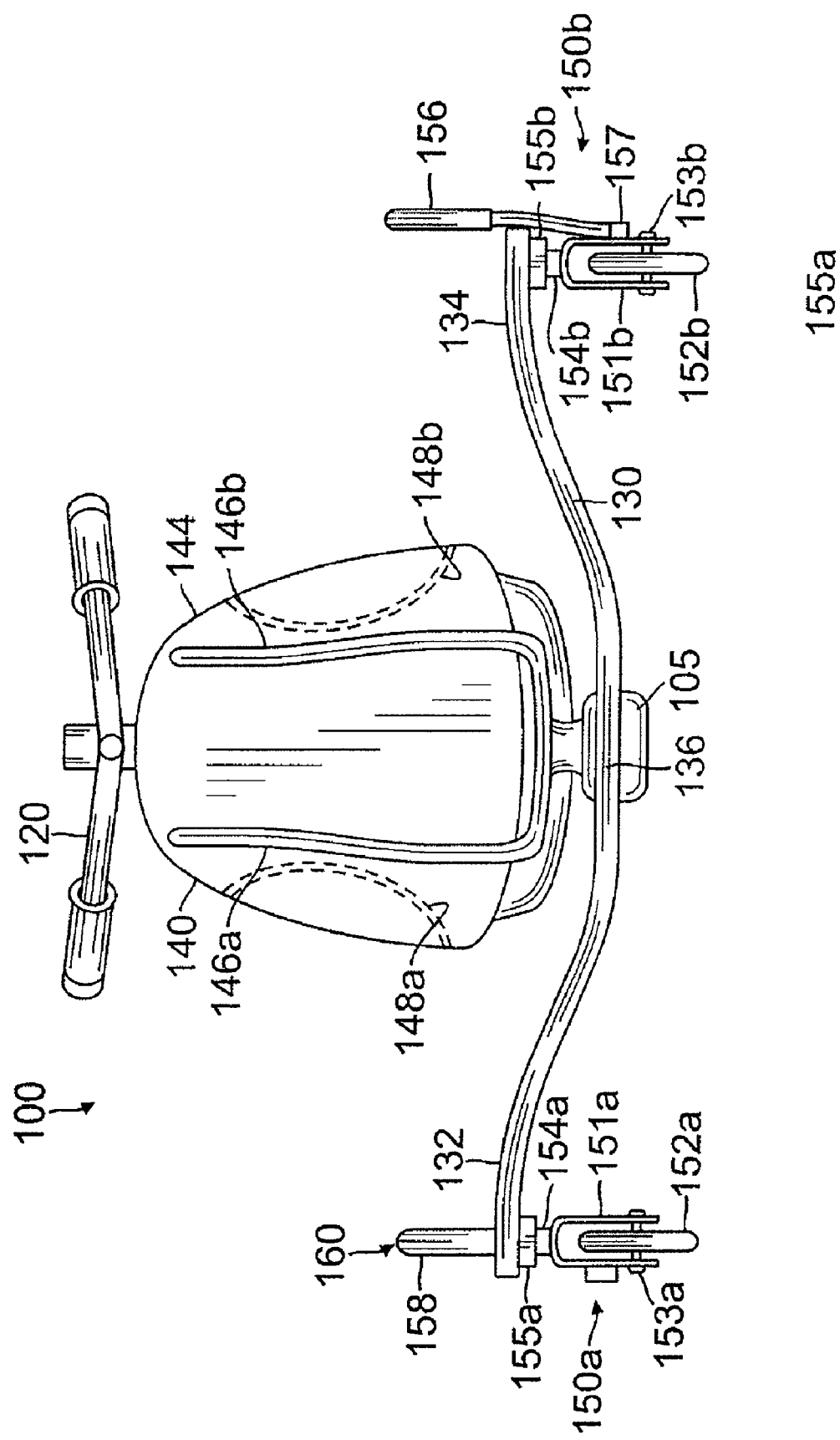
FIG. 1B is a rear view illustration of the cycle of FIG. 1A.
Figure 1C:
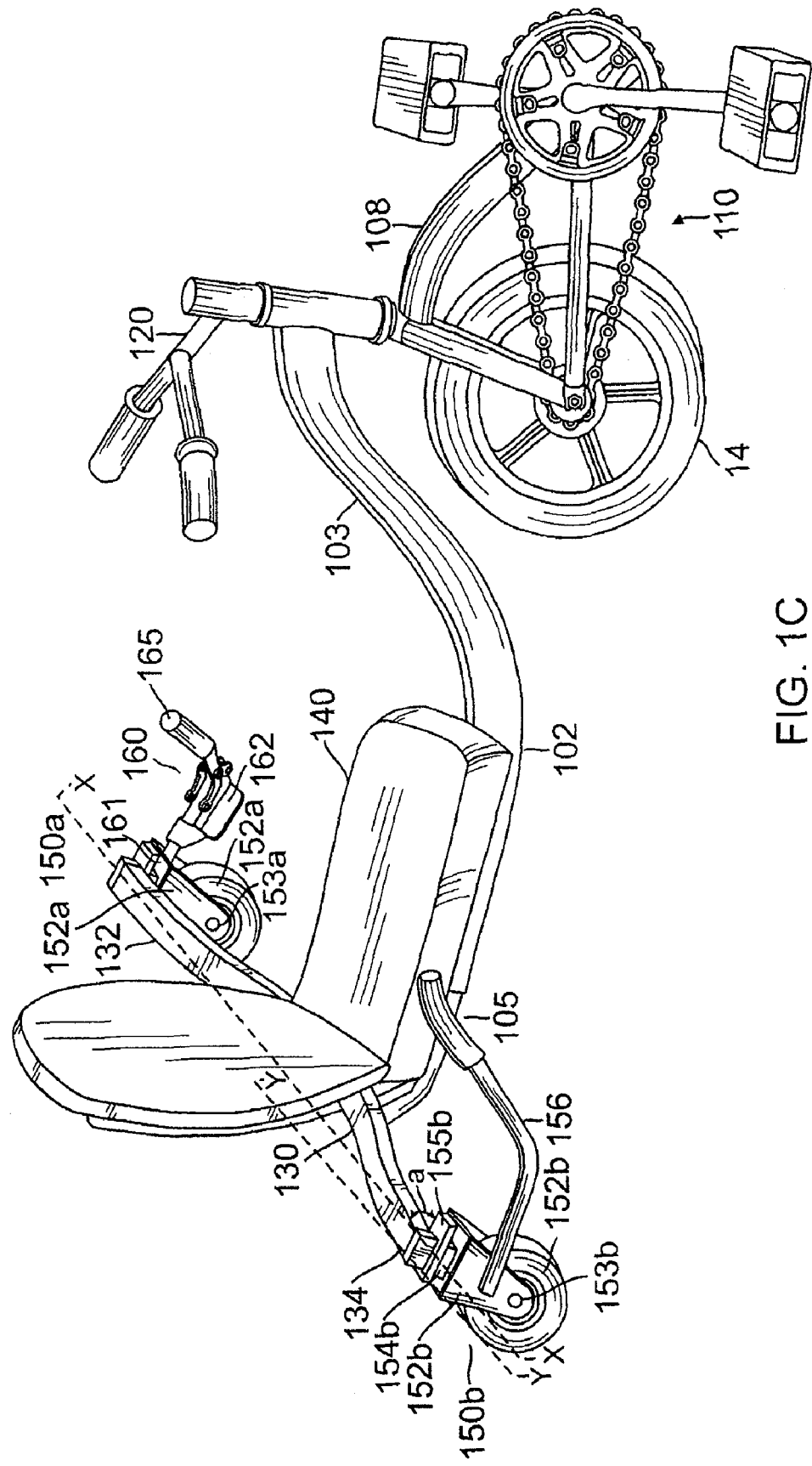
FIG. 1C is a perspective view of the cycle of FIG. 1A.
Figure 1D:
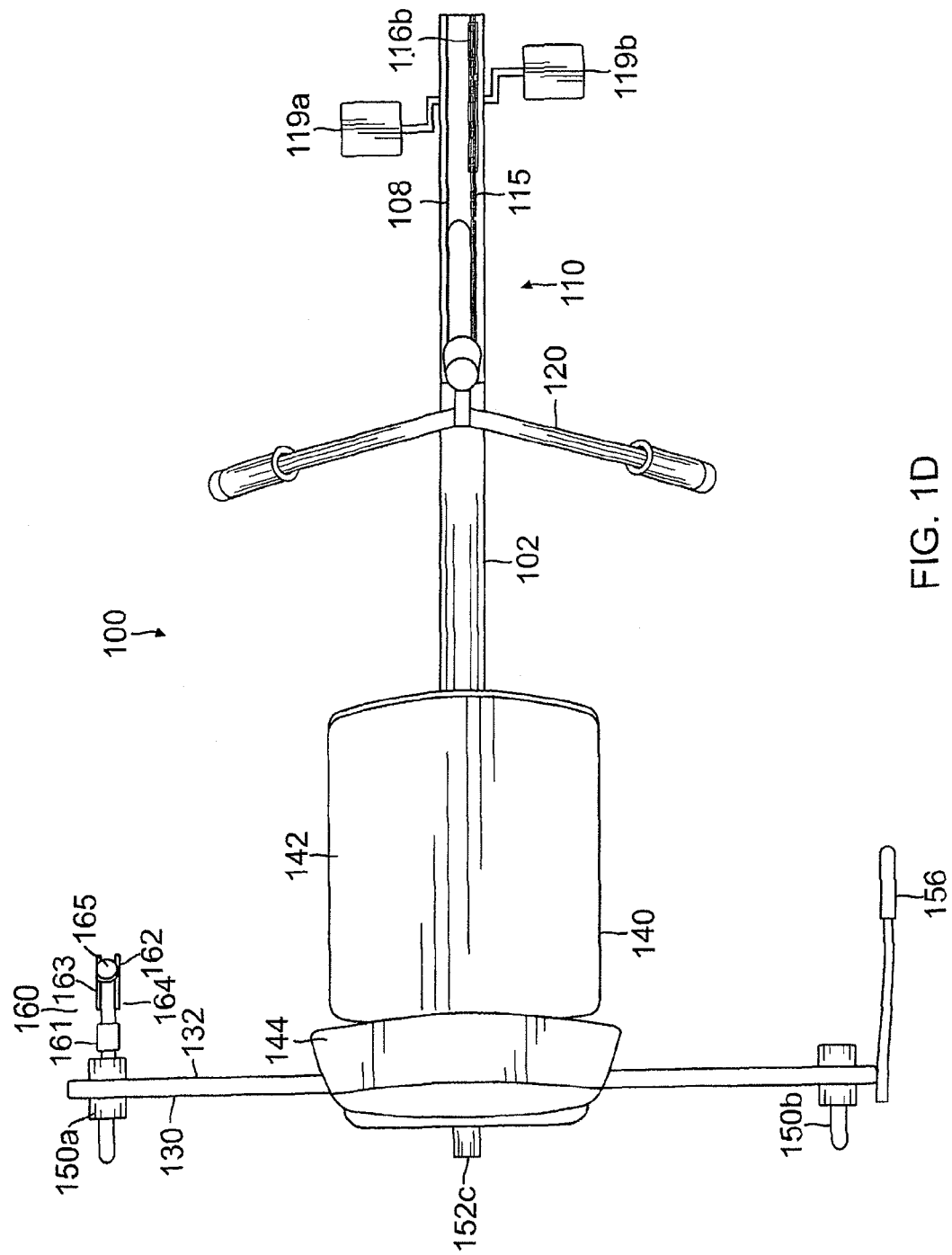
FIG. 1D is a top down view of the cycle of FIG. 1A.

With reference also to FIGS. 1B-D, the cycle 100 includes a crossbar 130 coupled to the rear portion 105 of the main frame 102. For instance, the main frame 102 may be coupled to the cross bar 130 in such a manner that it bisects, e.g., is perpendicular to, the cross bar 130. In one instance, the cross bar is coupled to an end of the main frame 105, and includes left and right side extending arms 132 and 134 of equal distance that extend outward from a central portion of the cross bar, e.g., by the seat, to opposite crossbar ends.

The cross bar 130 may be a single member or formed of multiple members. It may be fabricated out of any suitable material such as a rigid and lightweight material, for example, steel, titanium, aluminum, carbon fiber, thermoplastic, magnesium, bamboo, wood or the like, or combinations thereof. The cross bar 130 may be made as a single piece along with the main frame 102 or may be a separate member that is joined to the main frame 102 at the end portion 105. The cross bar 130 may be solid or a tubular member, and may be in any suitable shape. The cross bar 130 may be angled or curved, such as with respect to a non-angled lengthwise portion of the cross bar or with respect to the main frame 102, but is preferably horizontal at the left and right side extending arms 132 and 134.

As can be seen with respect to FIG. 1C, the cross bar 130 may include two or more rear wheel assemblies 150. In preferred exemplary implementations, the rear wheel assemblies 150 include a left and right rear wheel assembly 150a and 150b, respectively. As is described in greater detail below, the wheel assemblies 150a and b may be coupled to the cross bar 130 in such a manner that they are able to pivot along an axis y that is transverse to the length of an axis x of the cross bar 130. Likewise, the wheel assemblies 150a and 150b may include wheels 152a and b, wherein the wheels 152a and b are able to rotate in a circular motion along an axis x that is parallel to the length of the cross bar 130. As depicted, the cross bar 130 is configured so as to give the wheel assemblies 150a and b a forward, angled configuration.

Accordingly, each rear wheel assembly 150 may include a casing 151a and 151b, and a rear wheel 152a and 152b, respectively, where the casings 151a and 151b are designed to hold the wheel 152a and 152b and inhibit some external objects from connecting with the wheel 152a and 152b. For instance, the casing 151a and 151b may be configured such that it includes two elongated portions, i.e., prongs, into which the rear wheel 152a or 152b is inserted. The prongs of the casings 151 may include an orifice that is configured for receiving a rear wheel axle 153a and 153b.

Additionally, each casing 151a and 151b or wheel 152a and 152b is coupled to the distal ends of left and right side extending arms 132 and 134 and configured for pivoting around an axis y that is transverse to an axis x, where axis x is defined by length of the cross bar 130. The axis y is also angled forward, i.e. at a forward incline, so as one wheel assembly 150 pivots or turns, the other wheel assembly follows. The angle may be any suitable angle that gives one or more wheel assemblies and/or wheels an angled configuration and may range from about 2° to about 35° or more, such as between about 5° to about 30°, for instance, about 10° to about 25°, including about 15° to about 20°. The casings 151 or wheels 152 can be coupled to the left and right extending arms 132 and 134 via coupling members 155a and 155b, respectively. Each coupling member 155 can rotate up to 360 degrees, for unlimited rotational capability of the rear wheels 152. Accordingly, while each of the wheels 152 can roll and rotate independently, they will follow each other's movement due to the angle of axis y.

In some implementations, a spacer or shock absorber may also be included to increase the distance between the cross bar 130 and a central horizontal axis that bisects the wheel. Although the wheels 152 are depicted as being coupled to the cross bar 130 via casings 151, the casings 151 need not be included, rather the wheels 152 may be attached by any suitable attachment mechanism, such as by an L-shaped post or the like.

In some preferred implementations, the rear wheel assemblies 150 are casters, and the rear wheels 152a and 152b can be ball-shaped, or narrower tire shaped. For example, the rear wheel assemblies 150 can be dual inclined caster wheels with up to 360 degrees of rotation ability. The rear wheels 152 may have of any suitable diameter and may include a pneumatic tire or a tubeless tire that is supported by a rim and spokes akin to the front wheel 114. Alternatively, however, the rear wheels 152 may be fabricated out of polyurethane, rubber, plastic, a composite, and the like, and/or may have a diameter that is substantially less than the diameter of the front wheel 114.

For instance, the diameter of a rear wheel may have a diameter of about 6 inches or less, such as about 4 inches or less, for instance, about 3 inches or less, such as about 2 inches or less. In other examples, the diameter of a rear wheel 152 may range from about 50 to about 200 mm, to as large as 10 to 24 inches.

The cycle 100 further includes a rear steering mechanism 156. In some implementations, the rear steering mechanism is a handle or elongated arm attached to one or more of the rear wheel assemblies 150 and extending and/or bending upward for being easily grasped and operated by a rider. The rear steering mechanism 156 can be made of any suitable material so long as it is capable of being associated with a rear wheel assembly 150 and operated by a rider for directing a degree of pivot of the rear steering mechanism 156. For instance, the rear wheel assembly may be capable of pivoting laterally in a full circle. In some implementations, each rear wheel assembly 150 can be left free to pivot.

The rear steering mechanism 156 may be configured as an upward extending arm, and may be fabricated out of any suitable material such as a rigid and lightweight material, for example, steel, titanium, aluminum, carbon fiber, thermoplastic, magnesium, bamboo, wood or the like, or combinations thereof. The rear steering mechanism 156 may be configured for removable attachment to the wheel assembly 150. For example, the wheel assembly 150 may include a receiving member 157 that is configured for receiving the connecting portion of the rear steering mechanism 156 and thereby allowing the rear steering mechanism 156 to be coupled to the wheel assembly 150. See, for instance, FIG. 1B.

A rider, therefore, can manipulate the degree of pivot of a rear wheel assembly 150 and thereby direct the motion of the rear portion of the vehicle. Specifically, even though the rear wheel assemblies 150a and 150b are configured for pivoting independently of one another during use, the direction of one wheel assembly will often dictate the direction of the other wheel assembly, especially if the configuration of the vehicle gives the rear wheel assemblies 150 a forward angle. Thus, by controlling the degree of pivot of one of the wheel assemblies, e.g., by using the steering assembly 156 to steer the wheel assembly 150, a rider can dictate a direction of the rear portion of the vehicle. For instance, while the front portion of the vehicle may be steered by the handlebars 120 or pedals 119, thereby directing the direction of travel for the front portion of the cycle 100, the rear portion of the vehicle may be steered by the rear steering mechanism 156. Thus, the front and rear wheels of the cycle 100 may be steered independently to allow the vehicle to zig and zag in a criss-crossed manner, or to spin around in circles.

In certain instances, it may be desirable to lock at least one of the rear wheel assemblies, e.g., 150a, so as to ensure a straight and constant direction of travel for the rear wheels 152. Hence, the cycle 100 may include a rear locking mechanism 160 to lock a rear wheel assembly 150 in a particular orientation, such as a forward orientation, thus inhibiting both rear wheels 152 from rolling in any angle other than a straight direction. Accordingly, the locking mechanism 160 may be moveably connected to the cross bar 130 and/or wheel assembly 150 such that when engaged the rear locking mechanism 160 locks the wheel assembly 150 into a particular orientation. A single wheel assembly 150 may be associated with a rear locking mechanism 160, or two or more wheel assemblies, such as rear wheel assemblies 150a and b, may each be associated with individual rear locking mechanisms 160.

The rear locking mechanism 160 may be an elongated member having one or more of a connection portion 161, an engagement portion 162, and a handle portion 165. The connection portion 161 may have any suitable configuration and may be connected to the cross bar 130, or to a non-moveable member of the wheel assembly 150, in any suitable manner so long as it is capable of connecting the engagement portion 162 to a rear wheel assembly 150.

For instance, the connection portion 161 may be an elongated post that is welded onto a portion of the cross bar 130. The engagement portion 162 may be made of any suitable material and may have any configuration so long as it is capable of moving in relation to cross bar 130, and/or connection portion 161, and engaging part of the wheel assembly 150 and thereby preventing the wheel assembly 150 from pivoting. For example, as can be seen with respect to FIG. 1C, the engagement portion 162 of the locking mechanism 160 may have a number of engagement wings 163 and 164, which are set apart from one another by a distance sufficient to allow the wings to receive a portion of the wheel assembly 150 there between. When engaged with the wheel assembly 150, the wings 163, 164 prevents the wheel assembly from further pivoting. The handle portion 165 may have any suitable configuration so long as it allows a rider to manipulate the rear locking mechanism 160 so as to engage the wheel assembly 150 thereby preventing the wheel assembly from pivoting, e.g., locking it into a particular orientation. In some implementations, the handle portion is configured for being gripped by a hand of the rider and may include a gripping mechanism attached thereto.

The wheel assembly 150 may be configured for removably coupling with the locking mechanism 160. For example, the wheel assembly 150 may include a receiving member 159 that is configured for receiving the locking portion of the locking mechanism 160 and thereby allowing the locking mechanism 160 to be coupled to the wheel assembly 150. In some implementations, the rear steering assembly 156 and the rear locking mechanism 160 are coupled to opposite wheel assemblies and are interchangeable. In certain instances, the locking mechanism and the rear steering mechanism can be coupled together on the same rear wheel assembly, separately coupled to opposite rear wheel assemblies, or interchangeably and separately coupled to opposite rear wheel assemblies. In still yet another alternative, the rear steering mechanism 156 can have a free mode to enable steering of a rear wheel assembly 150 to which it is attached, as well as a locked mode to inhibit pivoting of that rear wheel assembly 150. The other rear wheel assembly may or may not need its own locking and/or steering mechanism in this implementation.

Figure 2:
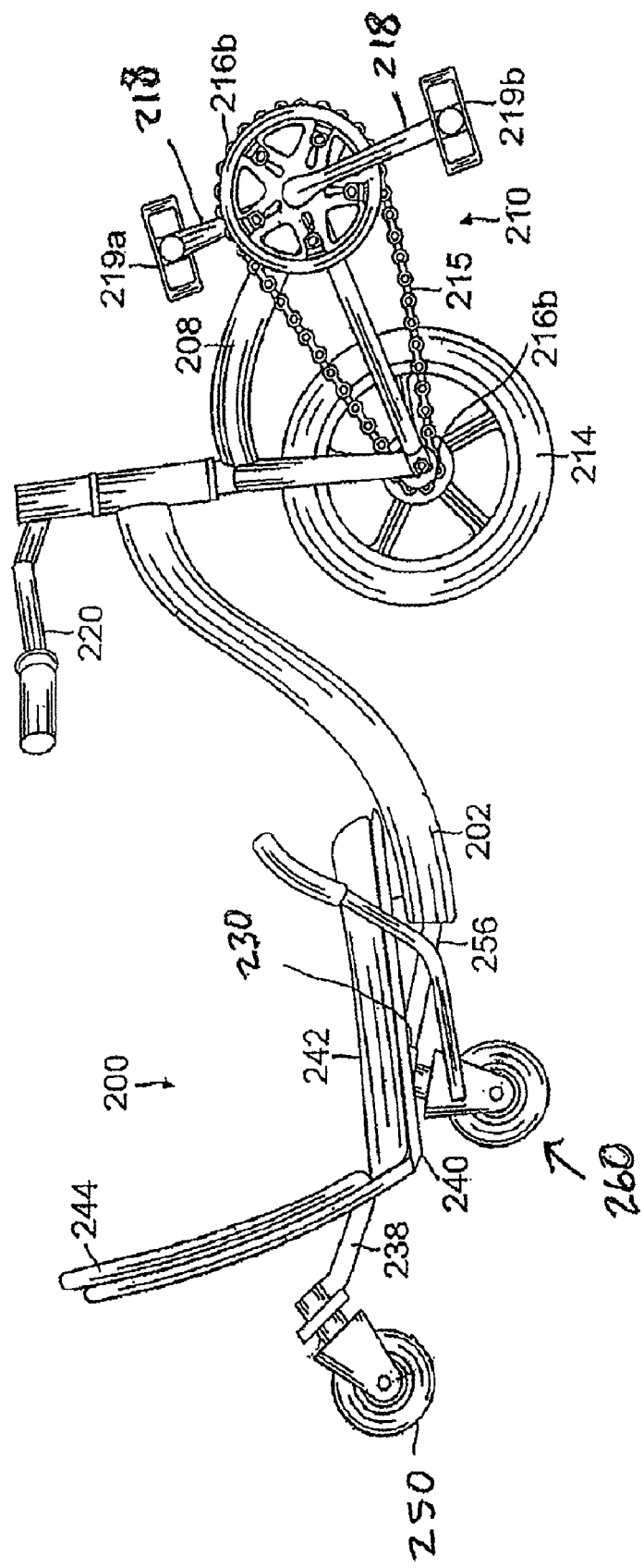
FIG. 2 is a side view of a cycle having a wheelie wheel according to an alternative implementation.

With reference now to FIG. 2, a cycle 200 can include one or more "wheelie" wheel assemblies 250 that extend back and up from near the seat 240 of the cycle 200. The wheelie wheel assembly 250 may include a rear wheel 252, which may be associated with a casing 251, and joined thereto via axle 253. The wheelie wheel assembly 250 may be coupled to the cross bar 230 or to a back support portion 244 of the seat 240 via a coupling element 238. The coupling element 238 may have any suitable configuration and may be made of any material so long as it is capable of associating the rear wheel assembly 250 with a rear portion of the vehicle 200. For instance, the coupling element 238 may be fabricated out of any suitable rigid and lightweight material such as, for example, steel, titanium, aluminum, carbon fiber, thermoplastic, magnesium, scandium, bamboo, wood or the like, or combinations thereof.

The coupling element 238 may join the wheelie wheel assembly 250 to a central portion of the cross bar 230 so as to bisect the cross bar 230. For example, the coupling element 238 may be coupled to a central portion 236 of the cross bar 230. Additionally, the coupling element 238 may have a substantial bend along its length such that during one mode of operation of the vehicle, when rear wheel assemblies 260 and the front wheel 214 are in contact with a surface, the wheelie wheel assembly 250 is not in contact with the surface, but rather displaced from the surface. Likewise, when rear wheel assemblies 260 and the wheelie wheel assembly 250 are in contact with the surface, the front wheel 214 is displaced from the surface.

In one particular example, the cycle 200 includes rear wheel assemblies 260 that are laterally displaced on either side of the seat 240, and one wheelie wheel assembly 250 that extends back and up from the seat 240 and behind the rear wheel assemblies 260. The seat 240 can include seat support 242 and back support 244. The rear wheel assemblies 260 may be connected to opposing end portions of the cross bar 230. The wheelie wheel assembly 250 may be positioned such that it extends from the central portion of the cross bar 236 but has an upward-turned shape. A rider can pull the cycle 200 back by front steering mechanism 220 and perform a "wheelie," whereby the cycle 200 pivots backward on the rear wheel assemblies 260 onto the wheelie wheel assembly 252, as the front wheel 214 rises upwards to disengage with the riding surface. It is to be noted that in the wheelie mode, the drive train 210 of the vehicle is disengaged as the front wheel has lost its contact with the surface, thus, the vehicle glides controlled by a rear steering mechanism, or uncontrolled on the wheelie wheel 252 and rear wheels 262.

Figure 3:
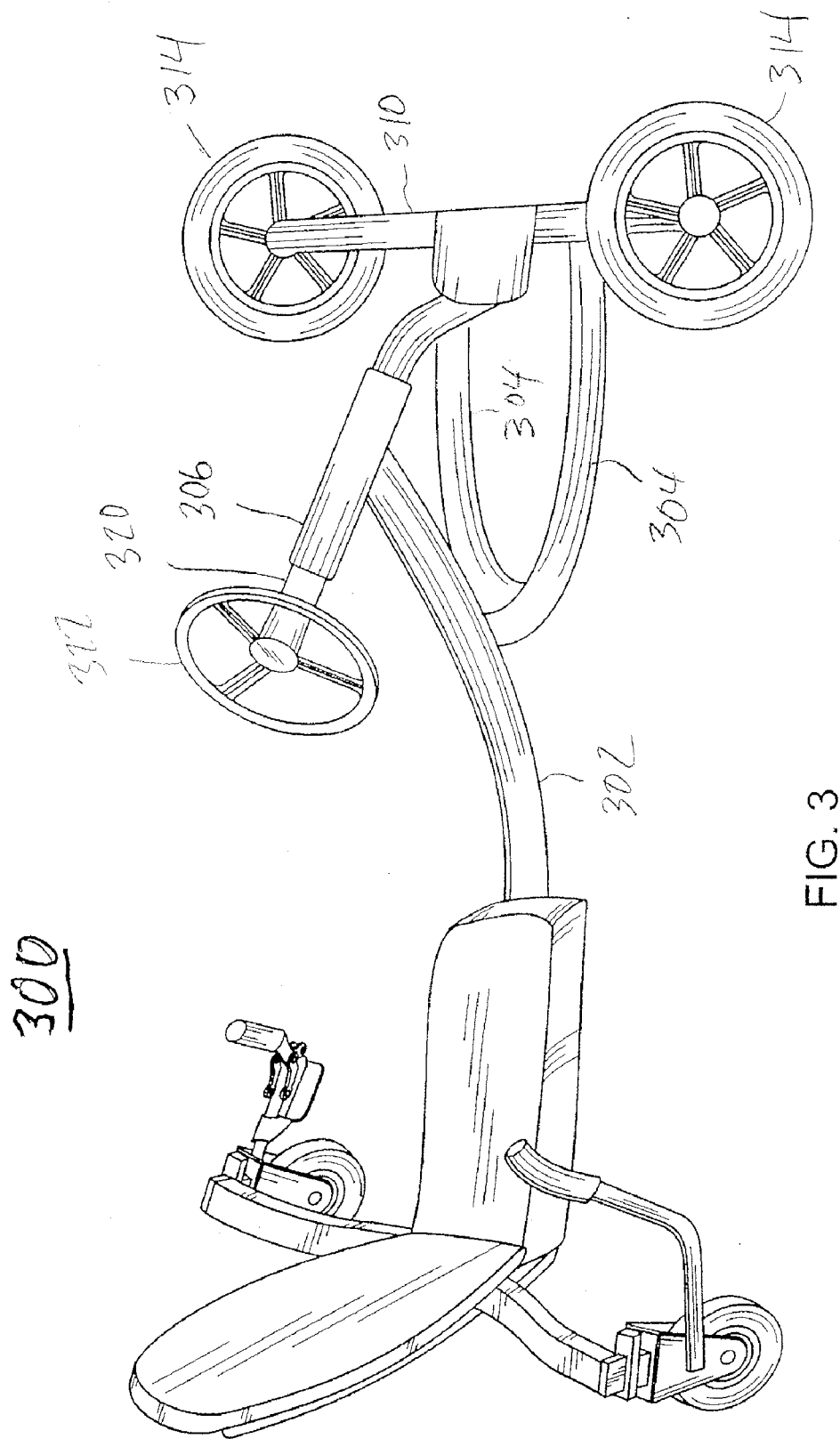
FIG. 3 is a perspective view of a cycle having a steering column for steering two front wheels.

FIG. 3 shows an alternative of a cycle 300 similar to cycle 100 above, but with a head tube 306 that houses at least part of a steering column 320 that is operated by a steering wheel 322 for steering two front wheels 314. The front wheels 314 are coupled to opposite ends of an axle 310, and can pivot side-to-side through the use of a series of transfer joints and/or gears that form the steering column 320 and transfer joints. In this way, the cycle 300 has more stability, and can be easier driven using one hand for the steering wheel 322. The cycle 300 can include a drive train (not shown) for driving one or more of the front wheels 314. The drive train can be located forward or behind the axle 310, and need not necessarily be movable as the drive train of cycle 100. The axle 310 and front wheels 314 can be supported by forward tubes 304 that are connected between the axle 310 or an axle sleeve, and a main frame 302.

FIGS. 4A-4F show various views of a cycle 400 that includes a main frame 410, a single front wheel 405, and two rear wheels 407 connected at opposite ends of a crossbar 430 that is connected to a rear portion of the main frame 410. A front wheel assembly 402 includes a forward tube 404 connected with a wheel support 406 through a channel or sleeve 411 in front portion 412 of the main frame 410. The front wheel assembly 402 can further include a chain stay 408 connected between the wheel support 406 and the end of the forward tube 404. The main frame 402, forward tube 404, wheel support 406, chain stays 408 and crossbar 430 can be formed of rigid hollow or solid material such as steel, titanium, aluminum, carbon fiber, thermoplastic, magnesium, scandium, bamboo, wood or the like, and can have a squared or rounded cross section of any diameter or size.

The cycle 400 further includes a front hand-steering mechanism 420 by which a rider can at least partially steer the front wheel 405. The front hand-steering mechanism 420 can include one or more handles 422 with hand grips 424. Where two handles 422 are used, the handles 422 can be symmetrical members that extend up and out for spaced positioning of both hands of a rider. The front hand-steering mechanism 420 is pivotally coupled to an opposite end of the forward tube 404 from a crankset 450 and crank shell provided at the intersection of the end of the forward tube 404 and chain stay(s) 408, such that the crankset 450 pivots along with a turn of the front wheel 405 or front hand-steering mechanism 420. The front hand-steering mechanism 420 can be pivoted to a desired position relative to the rest of the cycle 400 to be able to accommodate different riding styles or rider sizes. Accordingly, a rider can turn the front wheel 405 either by manipulating the crankset 450 with his or her feet and legs, or by operating the front hand-steering mechanism 420, or both.

The channel or sleeve 411 can include bearings an other hardware for connecting the forward tube 404/front hand-steering mechanism 420 with the wheel support 406, and enabling the front wheel assembly 402 to pivot relative to the main frame 410. The front hand-steering mechanism 420 can also include one or two break levers 423 of a hand brake system that are connected to a caliper-type brake. Alternatively, the cycle 400 may utilize a coaster brake integrated with the hub of front wheel 405. Other braking systems can also be suitably used.

Figure 4A:
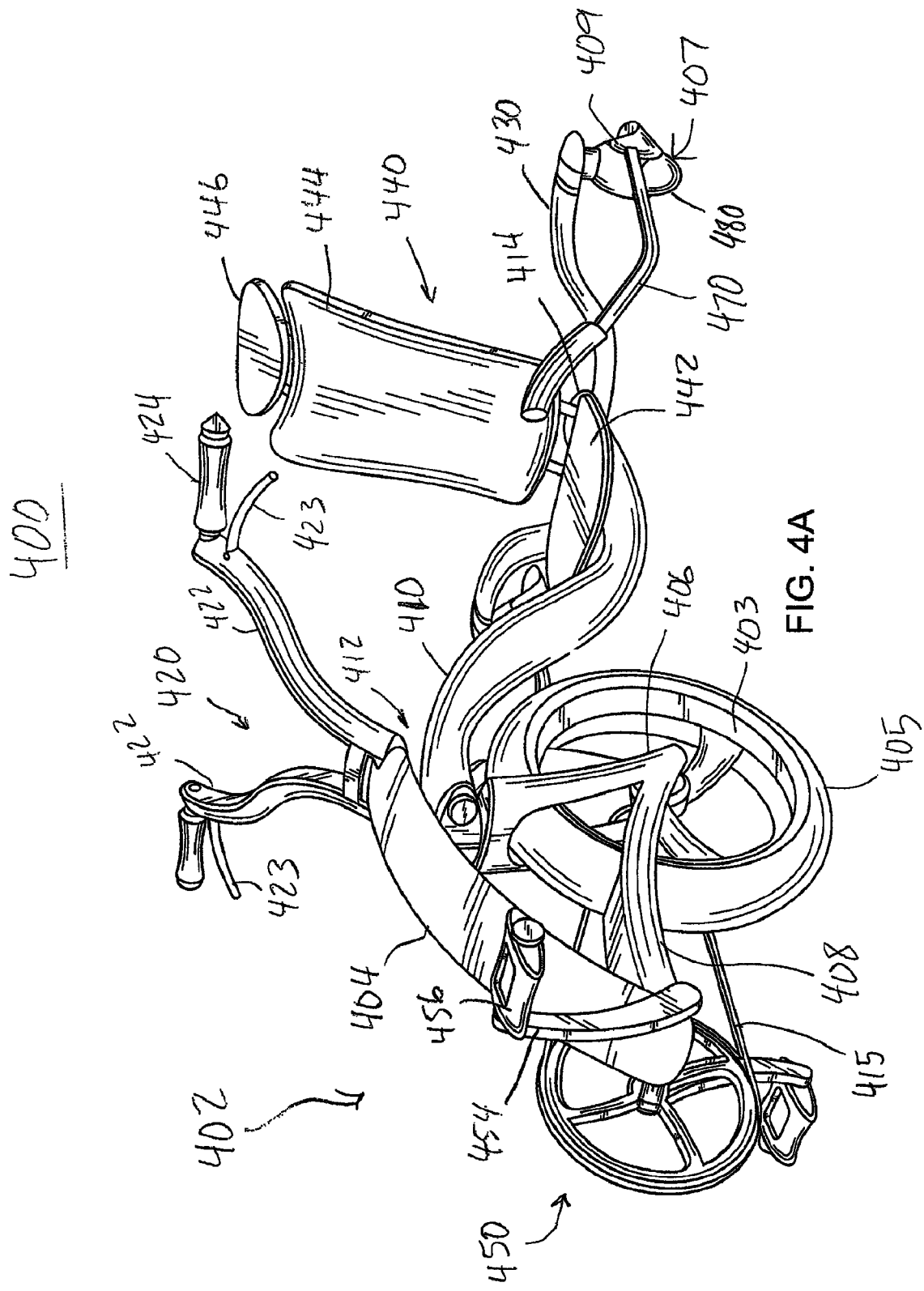
FIG. 4A is a side view illustration of a cycle according to yet another alternative.
Figure 4B:
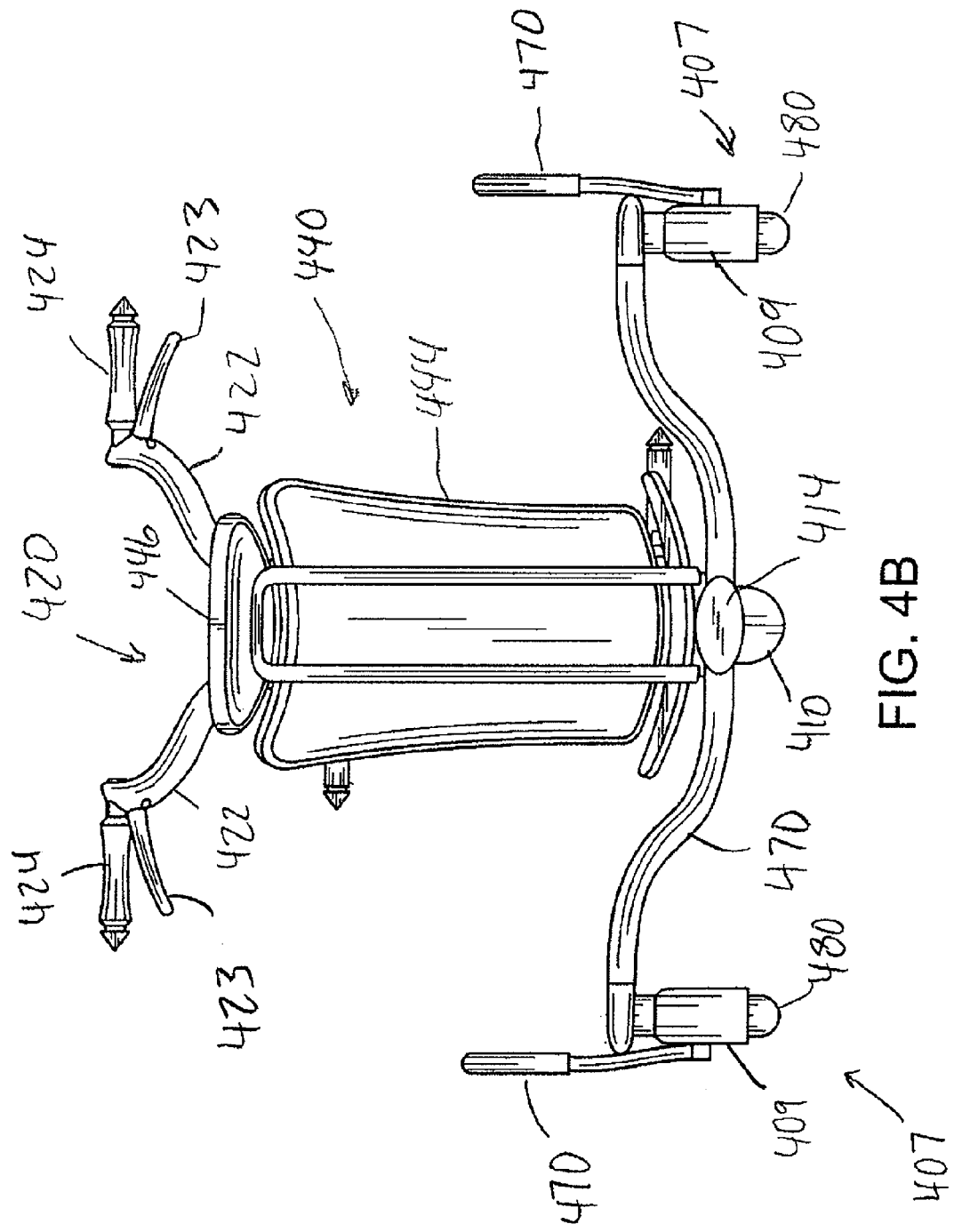
FIG. 4B is a rear view illustration of the cycle in FIG. 4A.
Figure 4C:
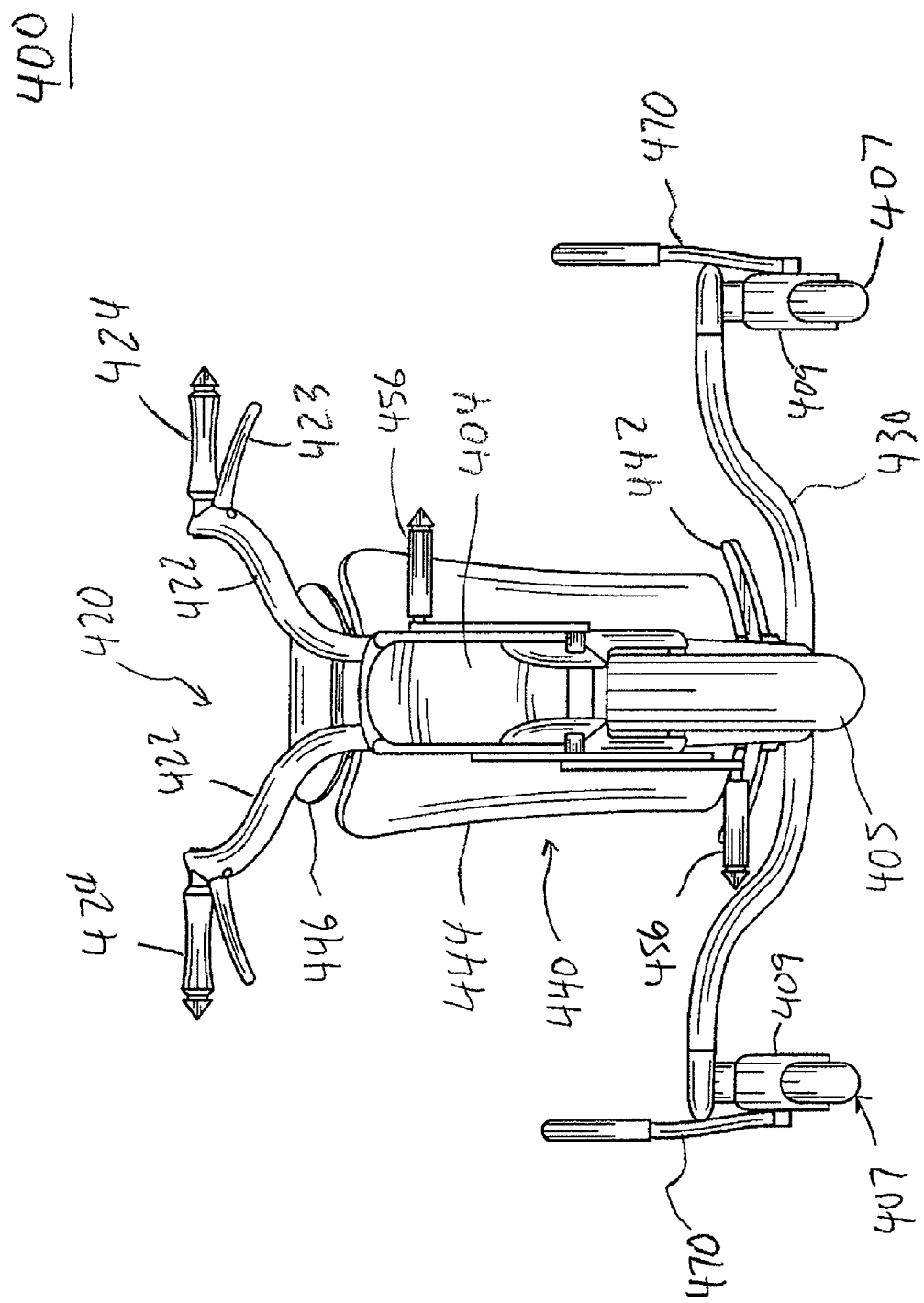
FIG. 4C is a front view of the cycle of FIG. 4A
FIGS. 4D and 4E are side views of a cycle in which a drive train can include a left- or right-mounted crank sprocket.
Figure 4D:
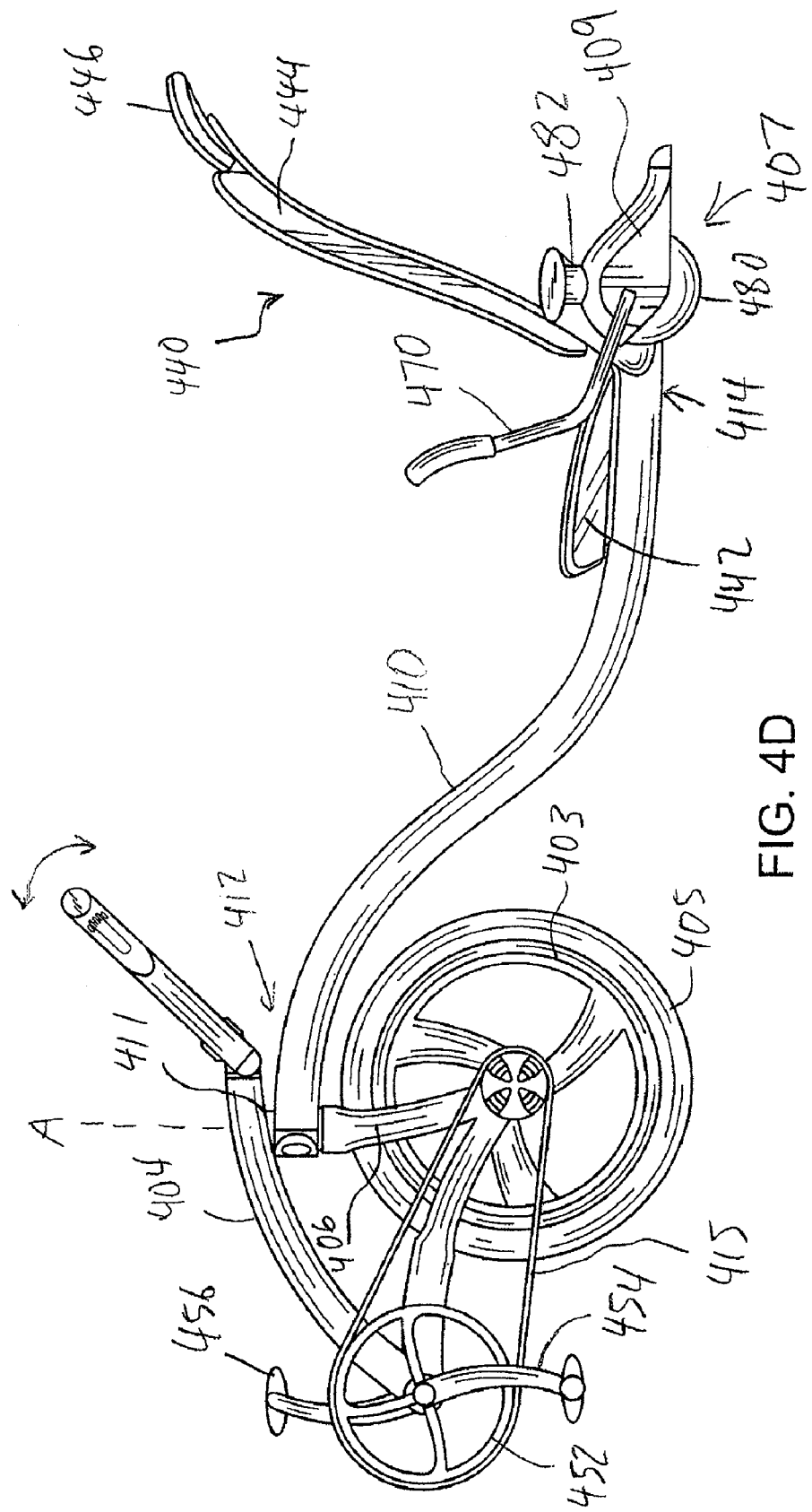
FIG. 4F is a top down view of the cycle of FIG. 4A.
Figure 4E:
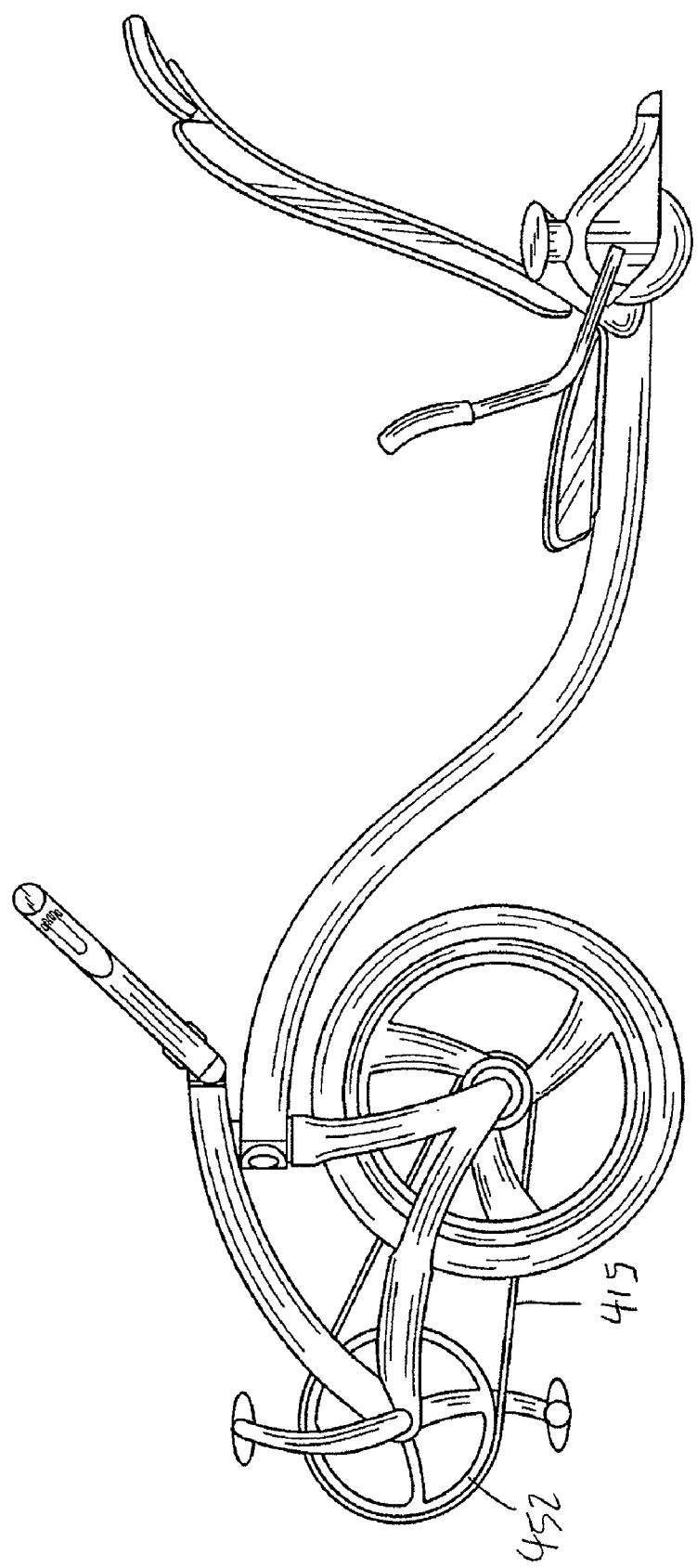
Figure 4F:
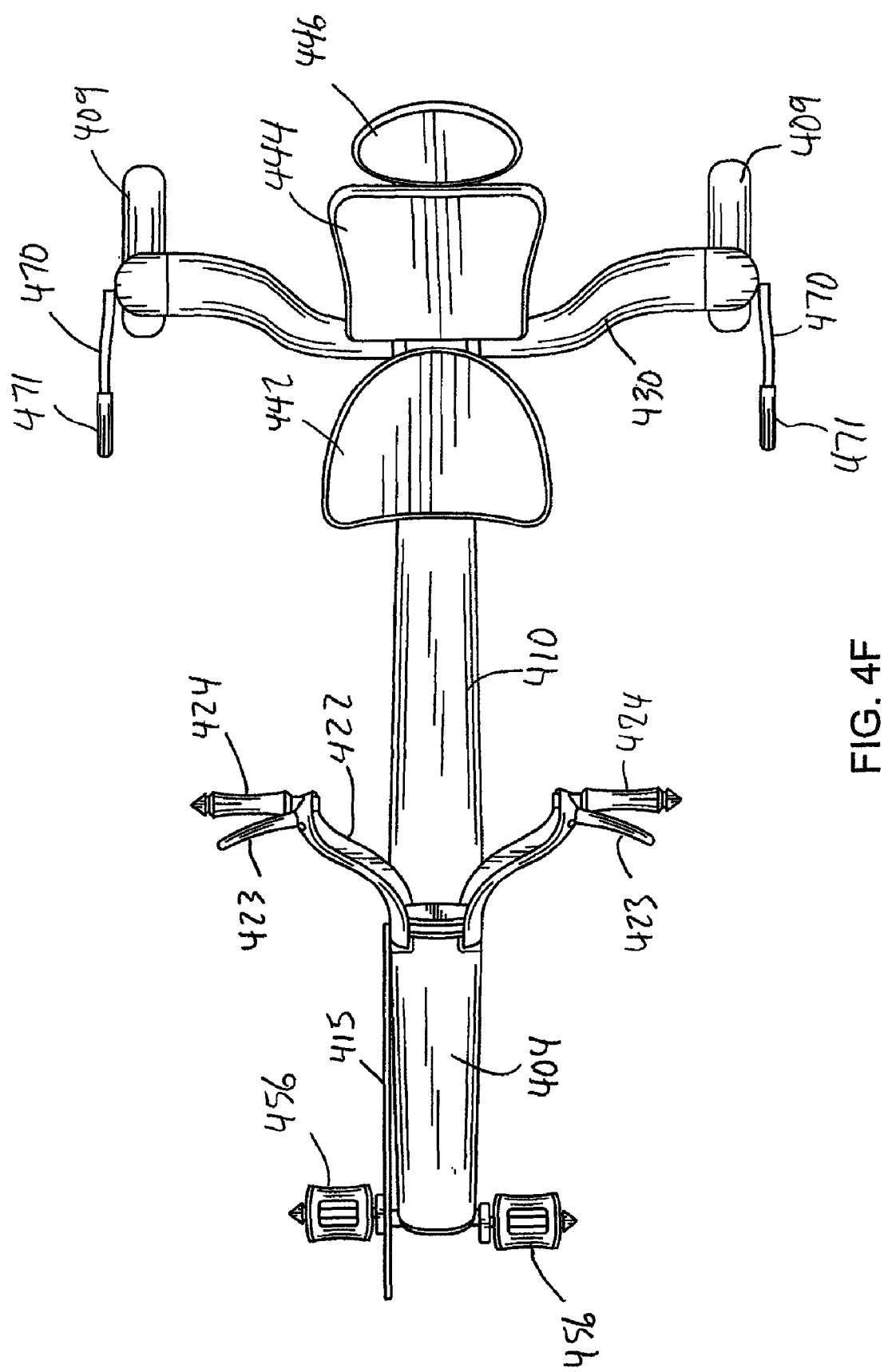

The crankset 450 of the front wheel assembly 402 includes a crank sprocket 452, a pair of crank arms 454 that are connected through a crank shell, and pedals 456 that extend oppositely from respective ends of crank arms 454. The crank shell further includes bearings and other hardware that allows the two crank arms 454 to interconnect and rotate in concert. The pedals 456 are operated by a rider to turn crank aims 454, similar to a conventional recumbent bicycle, such that the crank arms 454 cooperate to turn crank sprocket 452 and translate power via chain 458 to a wheel sprocket 460 connected to hub 462 of the front wheel 405. The crank sprocket 452 and the wheel sprocket 460 are geared respectively so as to provide a gear ratio of at least 2:1 and up to 10:1. Each sprocket may include more than one sprocket, and the cycle 400 may include a gear shifter for shifting among the more than one sprockets. FIGS. 4D and 4E illustrate that the crankset and chain may be placed on either side of the cycle 400.

The two rear wheels 407 can be caster-type wheels, i.e. preferably single wheel, swivel casters that include a wheel 480 mounted to a fork and a swivel joint above the fork, which enables the fork to freely rotate 360 degrees about a connector 482 that connects rear wheel 407 to an end of the crossbar 430. In some implementations, the wheel 480 is solid and formed of polyurethane, rubber, plastic, or nylon. In other implementations, the wheel 480 includes a pneumatic tire placed around a rim.

The rear wheels 407 are preferably connected at a slight incline back and down from the crossbar 430 by the connector 482, to provide forward momentum if either rear wheel 407 is turned. Accordingly, one or both of the rear wheels 407 can be controlled by a rear hand-steering mechanism 470. In some implementations, the rear hand-steering mechanism 470 includes a handle connected to a covering of 409 a rear wheel 407. The handle is specifically angled and sized so as to be readily accessible to a hand of a rider sitting on seat 440 in a recumbent position. When used in cooperation with the steering of the front wheel assembly 402, the rear hand-steering mechanism 470 allows a much richer variety of controlled movements and turns, as well as thrilling out-of-control moves, than a conventional cycle.

The seat 440 includes a bottom support 442 and a back support 444. Optionally, the seat 440 can include a head support 446 for supporting a rider's head. Any of the bottom support 442, back support 444 and head support 446 are adjustable for the comfort of a particular rider. For instance, the seat 440 can be slid forward or back, and may even be angled up or down, depending on the size and shape of a rider. The back support 444 is optimally narrow on its side where a rider may be extending an arm to engage the rear hand-steering mechanism 470. Alternatively, the back support 444 can include re-shaping rods or other such mechanism for changing the contour and shape of the back support 444 to accommodate a rider's preferences. Any part of the seat can be formed of a flexible mesh or padded material.

Optionally, one or both of the rear wheels 407 can be locked into a forward orientation, either by setting the rear hand-steering mechanism 470 to a particular position (i.e. up or down), or by a separate locking mechanism (not shown), substantially as described above. In such a locked position, the rear wheels 407 will roll straight ahead and follow the direction of the front wheel 405 as it is steered.

Although a few embodiments have been described in detail above, other modifications are possible. Other embodiments may be within the scope of the following claims.

The invention claimed is:

1. A cycle comprising:
a main frame;
a front wheel assembly connected with a front portion of the main frame, the front wheel assembly including a front wheel and a drive train having one or more chain stays connected with a wheel support that holds the front wheel, the drive train further including a pedal-driven crankset for driving the front wheel, the front wheel assembly further including a front hand-steering mechanism connected with the wheel support to rotate the front wheel assembly relative to the main frame;
a seat coupled on a back portion of the main frame; and
a rear wheel assembly connected with the back portion of the main frame, and including a pair of rear swivel caster wheels, each swivel caster wheel being connected at an incline to an opposite distal end a lateral extension of the main frame, the rear wheel assembly further including a rear hand-steering mechanism connected with at least one of the rear swivel caster wheels.

2. The cycle in accordance with claim 1, wherein the main frame is formed of a single curved frame member.

3. The cycle in accordance with claim 1, wherein the seat includes a bottom support mounted above the back portion of the main frame, and a back support coupled to the bottom support.

4. The cycle in accordance with claim 3, further comprising a head support coupled on top of the back support.

5. The cycle in accordance with claim 1, wherein the front hand-steering mechanism includes handlebars.

6. The cycle in accordance with claim 1, wherein the back hand-steering mechanism includes a handle mounted to a covering that covers the at least one of the rear swivel caster wheels.

7. The cycle in accordance with claim 1, wherein each of the pair of rear swivel caster wheels are connected to a cross bar at a forward incline.

8. The cycle in accordance with claim 1, wherein the pair of rear swivel caster wheels include wheels formed of polyurethane.

9. The cycle in accordance with claim 1, wherein the front wheel includes a pneumatic tire.

10. The cycle in accordance with claim 1, wherein the pedal-driven crankset includes a crank sprocket connected by a chain to a wheel sprocket mounted on a hub of the front wheel, and wherein the crank sprocket and the wheel sprocket are geared for at least a 2:1 gear ratio.

11. Cycle comprising:
a main frame having a front portion and a back portion, the back portion having opposite laterally extending members;

a front wheel assembly connected with the front portion of the main frame, the front wheel assembly including a wheel support that holds a front wheel and a pedal-driven crankset for driving the front wheel;

a front hand-steering mechanism connected with the wheel support and a forward tube to steer the front wheel relative to the main frame;

a seat coupled on a back portion of the main frame;

a rear wheel assembly connected with the back portion of the main frame, the rear wheel assembly including a pair of rear wheels connected to a distal end of the opposite laterally extending members; and a rear hand-steering mechanism connected with at least one of the rear wheels to steer the at least one of the rear wheels.

12. The cycle in accordance with claim 11, wherein the main frame is formed of a single curved frame member.

13. The cycle in accordance with claim 11, wherein the seat includes a bottom support mounted above the back portion of the main frame, and a back support coupled to the bottom support.

14. The cycle in accordance with claim 11, wherein the front hand-steering mechanism includes handlebars.

15. The cycle in accordance with claim 1, wherein each of the rear wheels are swivel casters having a polyurethane wheel, and each swivel caster includes a covering that is connected to a cross bar at a forward incline.

16. The cycle in accordance with claim 11, wherein the back hand-steering mechanism includes a handle mounted to the covering.

17. The cycle in accordance with claim 1, wherein each of the front wheel and the two rear wheels include a pneumatic tire.

18. The cycle in accordance with claim 1, wherein the pedal-driven crankset includes a crank sprocket connected by a chain to a wheel sprocket mounted on a hub of the front wheel, and wherein the crank sprocket and the wheel sprocket are geared for at least a 2:1 gear ratio.

19. The cycle in accordance with claim 14, wherein the handlebars includes an articulation joint to allow the handlebars to be pivoted to a desired angle.

20. A cycle comprising:

a main frame having a front portion and a back portion;

a front wheel assembly connected with the front portion of the main frame, the front wheel assembly including a wheel support that holds a front wheel and a pedal-driven crankset for driving the front wheel;

a front hand-steering mechanism connected with the wheel support and a forward tube to steer the front wheel relative to the main frame;

a seat coupled on a back portion of the main frame;

a rear wheel assembly connected with the back portion of the main frame, the rear wheel assembly including a cross bar mounted laterally to the main frame and extending out opposite sides aft of the seat, the rear wheel assembly further including a pair of rear wheels, each rear wheel being connected to an opposite distal end of the cross bar at an incline;

a rear hand-steering mechanism connected with at least one of the rear wheels to steer the at least one of the rear wheels; and a rear wheel locking mechanism connected with at least one of the rear wheels to lock the at least one of the rear wheels in a straightforward position.

\* \* \* \* \*